(12) United States Patent
Juettner et al.

(10) Patent No.: US 8,496,288 B2
(45) Date of Patent: Jul. 30, 2013

(54) OUTER SIDE WALL STRUCTURE, OUTER SIDE WALL MODULE, AND SIDE WALL FOR A MOTOR VEHICLE

(75) Inventors: Marc Juettner, Nackenheim (DE); Markus Schultheis, Hochheim am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/367,431

(22) Filed: Feb. 7, 2012

(65) Prior Publication Data

US 2012/0200119 A1 Aug. 9, 2012

(30) Foreign Application Priority Data

Feb. 9, 2011 (DE) .................... 10 2011 010 717

(51) Int. Cl.
*B62D 25/04* (2006.01)
(52) U.S. Cl.
USPC ................................ 296/193.05; 296/193.06
(58) Field of Classification Search
USPC ........................... 296/193.06, 193.05, 203.03
See application file for complete search history.

(56) References Cited

U.S. PATENT DOCUMENTS

| | | | |
|---|---|---|---|
| 6,910,732 B2 * | 6/2005 | Miyoshi et al. ........ | 296/203.03 |
| 7,396,072 B2 | 7/2008 | Fischer et al. | |
| 2005/0189790 A1 | 9/2005 | Chernoff et al. | |
| 2006/0097549 A1 | 5/2006 | Fischer et al. | |
| 2007/0107819 A1 | 5/2007 | Gehringhoff et al. | |
| 2010/0327630 A1 | 12/2010 | Klimek et al. | |

FOREIGN PATENT DOCUMENTS

| | | |
|---|---|---|
| DE | 19508970 A1 | 2/1996 |
| DE | 102004053917 B3 | 4/2006 |
| DE | 102005054847 B3 | 10/2007 |
| DE | 102008017976 A1 | 11/2008 |
| DE | 102007037510 A1 | 2/2009 |
| DE | 102007038087 A1 | 2/2009 |
| EP | 1052164 A1 | 11/2000 |
| GB | 620526 A | 3/1949 |
| GB | 2001915 A | 2/1979 |
| JP | 10100934 A | 4/1998 |

OTHER PUBLICATIONS

UK IPO, German Search Report for Application No. 1117990.0, dated Feb. 2, 2012.
German Patent Office, German Search Report for Application No. 102011010717.7, dated Aug. 9, 2011.

* cited by examiner

*Primary Examiner* — Joseph Pape
(74) *Attorney, Agent, or Firm* — Ingrassia Fisher & Lorenz, P.C.

(57) ABSTRACT

An outer side wall structure for a motor vehicle, in particular a passenger automobile, having a front section and a rear section, between which at least one door of the motor vehicle can be situated, and having an upper section and a lower section. It is provided that the sections form a peripheral frame.

10 Claims, 3 Drawing Sheets

OUTER SIDE WALL STRUCTURE, OUTER SIDE WALL MODULE, AND SIDE WALL FOR A MOTOR VEHICLE

CROSS-REFERENCE TO RELATED APPLICATION

This application claims priority to German Patent Application No. 10 2011 010 717.7, filed Feb. 9, 2011, which is incorporated herein by reference in its entirety.

TECHNICAL FIELD

The technical field relates to an outer side wall structure for a motor vehicle, in particular a passenger automobile, having a front section and a rear section, between which at least one door of the motor vehicle can be situated. Furthermore, the technical field relates to an outer side wall module and a side wall for a motor vehicle as well as a motor vehicle.

BACKGROUND

Modern motor vehicles typically have a vehicle body, which is especially stiffened or reinforced to protect the occupants in case of a crash. For example, the side walls of modern motor vehicles have a separate reinforcement structure, which is situated between the outer skin and the inner skin of the side wall. The reinforcement structure typically forms the supporting structure of the side wall, on which the outer skin is fixed, the outer skin assigned a non-supporting function.

Efforts are made in the development of new vehicle generations to reduce the $CO_2$ emissions of the vehicles still further than previously. A reduction of the $CO_2$ emissions can be achieved, for example, in that the weight of the motor vehicle is decreased.

In view of the foregoing, at least one object is to provide a side wall for a motor vehicle, in particular a passenger automobile, which can be implemented as lighter with respect to weight than previously, without its reinforcement action with respect to the vehicle body being impaired. Furthermore, at least another object is to provide a vehicle that is suitable for the use of such a side wall. In addition, other objects, desirable features, and characteristics will become apparent from the subsequent summary and detailed description, and the appended claims, taken in conjunction with the accompanying drawings and this background.

SUMMARY

An outer side wall structure is provided for a motor vehicle, in particular a passenger automobile, which has a front section and a rear section, between which at least one door of the motor vehicle can be situated. The outer side wall structure is to be understood as the external structure of a side wall for a motor vehicle. The outer side wall structure is therefore situated on the side of the side wall of the motor vehicle oriented outward from the interior of the motor vehicle. The outer side wall structure has an upper section and a lower section, which form a peripheral frame with the front section and the rear section of the outer side wall structure.

An outer side wall structure having higher stability is implemented by this measure. The outer side wall structure is reinforced and stiffened by the peripheral frame, so that the outer side wall structure can assume a supporting function in the side wall of the motor vehicle. By means of the outer side wall structure, side walls for a motor vehicle may be implemented which do not require a reinforcement structure located between the inner skin and the outer side wall structure, since the reinforcing effect is exerted by the outer side wall structure. A side wall that is significantly lighter with respect to weight than previously may therefore be implemented using the outer side wall structure.

The sections are preferably implemented as essentially oblong. The upper section is preferably connected once to the front section and once to the rear section in longitudinal extension at its two end areas, the front section, and the rear section each in turn being attached at their respective end sections to the upper section. The still free end area of the front section and the rear section is preferably connected to the respective end areas of the lower section, so that the peripheral or closed frame is formed. The frame can be implemented like a ring.

According to an embodiment, it is provided that the sections are integrally connected to one another. A reduction in parts is thus achieved with respect to the outer side wall structure, since the front section, the rear section, the upper section, and the lower section are provided in one piece, i.e., form a common part. Complex assembly of multiple individual parts and also costly and complex storage of the individual parts are thus avoided.

According to a further embodiment, it is provided that the outer side wall structure or at least the sections comprise a high-strength steel or a high-strength steel alloy. This measure contributes to a reinforcement of the side wall structure, so that the side wall structure withstands an increased stress and can therefore preferably be used as a supporting component of the side wall of the motor vehicle. Through the use of the high-strength material, the side wall of a motor vehicle can also be used as a load-bearing structure without a separate reinforcement structure, but rather only having the outer side wall structure, the side wall nonetheless offering sufficient protection of the occupants in the passenger compartment in the event of a crash of the motor vehicle.

According to one embodiment, it is provided that the front section is attachable to an A column of the motor vehicle, forms an A column of the motor vehicle, or is part of an A column of the motor vehicle. Another embodiment provides that the rear section is attachable to a B, C, or D column of the motor vehicle, forms a B, C, or D column of the motor vehicle, or is part of a B, C, or D column of the motor vehicle. Due to the extension of the front section up to or up into the A column and the extension of the rear section up to or up into the B, C, or D column of the motor vehicle, the outer side wall structure extends essentially over the area of the passenger compartment of the motor vehicle in the longitudinal direction of the motor vehicle.

The high reinforcement action through the frame-shaped embodiment of the sections therefore acts essentially over the entire passenger compartment in the longitudinal direction of the motor vehicle. It suggests itself that the rear section is attachable to a rear side wall structure, in particular an external rear side wall structure. A flange is thus implemented by the rear section, which is implemented to attach further side wall structures.

Another embodiment provides that the upper section is attachable to the roof area of the motor vehicle or is part of the roof area of the motor vehicle. Furthermore, it is provided that the lower section is attachable to a sill structure of the motor vehicle, forms a sill structure of the motor vehicle, or is part of a sill structure of the motor vehicle. Through the assignment of the upper section to the roof area and the lower section to the sill structure of the motor vehicle, a particularly stable composite with further reinforcement components of the vehicle body can be implemented by the outer side wall structure according to the invention. Together with the roof area and the sill structure, a particularly stable passenger compartment can thus be implemented, in which the outer side wall structure forms one of the supporting components.

According to another embodiment, it can be provided that the upper section and the lower section each have at least one attachment point for attaching a reinforcement element, in particular a B column or a part of a B column. The peripheral frame structure, which is formed from upper section, lower section, front section, and rear section, thus extends from the front area of the passenger compartment up into the rear area of the passenger compartment. The frame structure therefore already causes a reinforcement of the vehicle body in the area of the passenger compartment without the reinforcement element or the B column. A more extensive stiffening or reinforcement of the vehicle body in the side wall area can be implemented by the reinforcement element or B column attachable to the attachment point.

According to another embodiment, an outer side wall module is provided for a motor vehicle, in particular a passenger automobile. The outer side wall module has at least one outer side wall structure of the above-described type and has a rear outer side wall structure connected thereto. The outer side wall structure preferably has a greater material thickness in relation to the rear outer side wall structure. A weight savings is thus achieved, since the outer side wall structure has a material thickness corresponding to its supporting function. The rear outer side wall structure adjoining thereon, which is preferably assigned a lesser or no supporting function, is implemented as thinner with respect to the material thickness. Therefore, because of the weight savings in the vehicle body, a reduction of the $CO_2$ emissions is achieved by the differentiation of the material thicknesses of outer side wall structure and outer rear side wall structure.

According to another embodiment, it can be provided that the rear side wall structure is implemented as a fender. Therefore, the rear outer side wall structure is essentially used for the external appearance of the motor vehicle, which is achieved by the respective implemented design of the fender.

Furthermore, a side wall is provided for a motor vehicle having an outer side wall structure of the above-described type and an inner side wall structure. The inner side wall structure is to be understood in the context of the invention as the side wall structure that faces toward the passenger compartment or the interior of the motor vehicle. The side wall is preferably essentially free of a reinforcement structure located between the outer side wall structure and the inner side wall structure. The side wall is relatively light with respect to weight, since the separate reinforcement structure, which is located between the outer side wall structure and the inner side wall structure, can be dispensed with due to the supporting function of the above-described outer side wall structure.

According to another embodiment, a motor vehicle, in particular a passenger automobile is provided having an outer side wall module of the above-described type. Through the embodiments, a side wall for a motor vehicle, a vehicle body, and a motor vehicle, in particular a passenger automobile, can be implemented, which are relatively light with respect to weight, since the outer side wall structure is implemented as stiffened and reinforced and can thus exert a supporting function. In contrast to the previously implemented side walls of a motor vehicle, a reinforcement structure provided between the inner skin and the outer skin or outer side wall structure can thus be dispensed with. By omitting such a separate reinforcement structure, individual components are reduced during the assembly of the vehicle body, so that because of this parts reduction, the assembly is simplified. A cost savings is also thus achieved. In addition, the sheet-metal waste rate can be reduced in the implementation of the vehicle body. Furthermore, a reduction of the subassemblies is at least one result.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
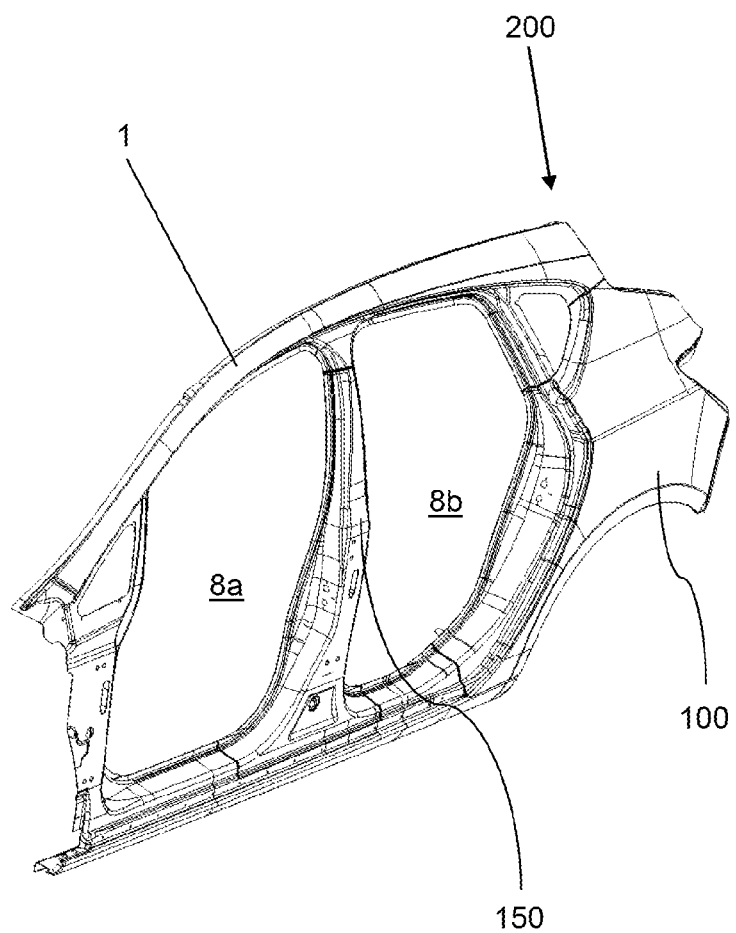
FIG. 1 shows a possible embodiment of an outer side wall module for a motor vehicle in a perspective view.
Figure 2:
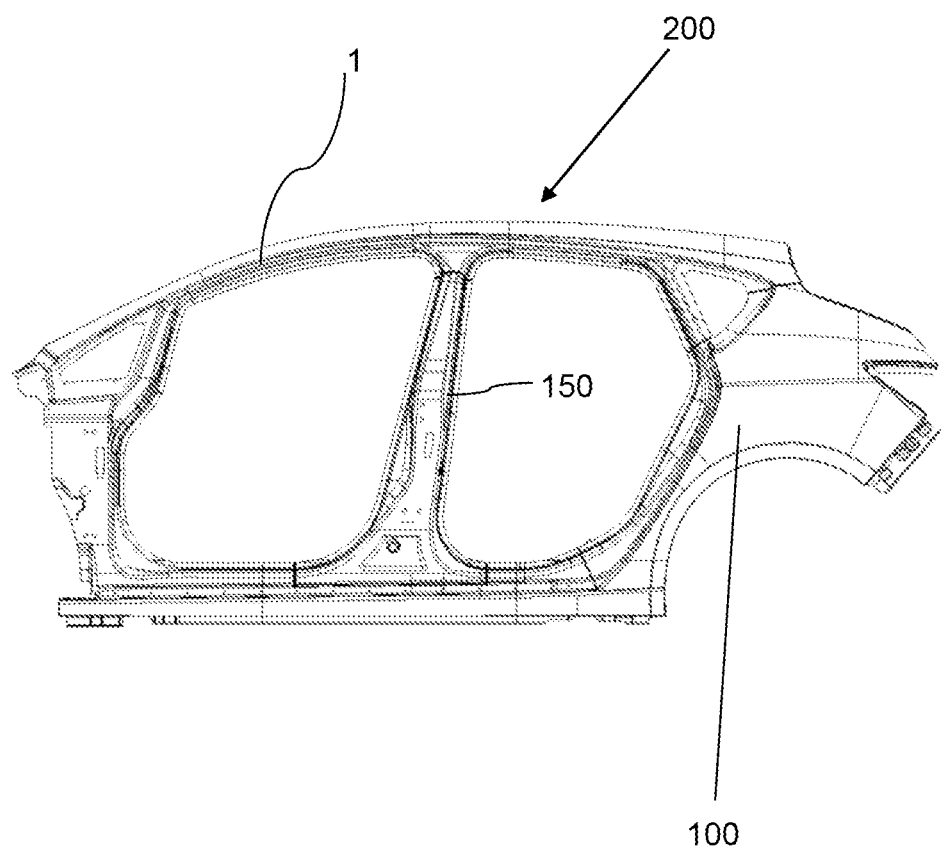
FIG. 2 shows the side wall module according to FIG. 1 in a side view.

FIG. 1 and FIG. 2 show, in schematic views, a possible embodiment of an outer side wall module 200, which preferably forms the lateral outer skin of a motor vehicle (not shown in FIG. 1 and FIG. 2). The side wall module 200 is constructed in multiple parts, in particular at least two parts, preferably at least three parts, and has an outer side wall structure 1, a rear outer side wall structure 100, and an outer reinforcement element 150. The reinforcement element 150 forms the B column of the motor vehicle or is at least one part of the B column of the motor vehicle. A passage opening formed by the outer side wall structure 1 is divided by the reinforcement element 150 into two separate passage openings 8a, 8b, within each of which a door (not shown in FIG. 1 and FIG. 2) of the motor vehicle can be situated or accommodated.

The passage opening 8a is preferably implemented to accommodate the front door (not shown in FIG. 1 and FIG. 2) of the motor vehicle and the passage opening 8b is implemented to accommodate the rear doors of the motor vehicle (not shown in FIG. 1 and FIG. 2). The rear side wall structure is preferably implemented as a fender.

Figure 3:
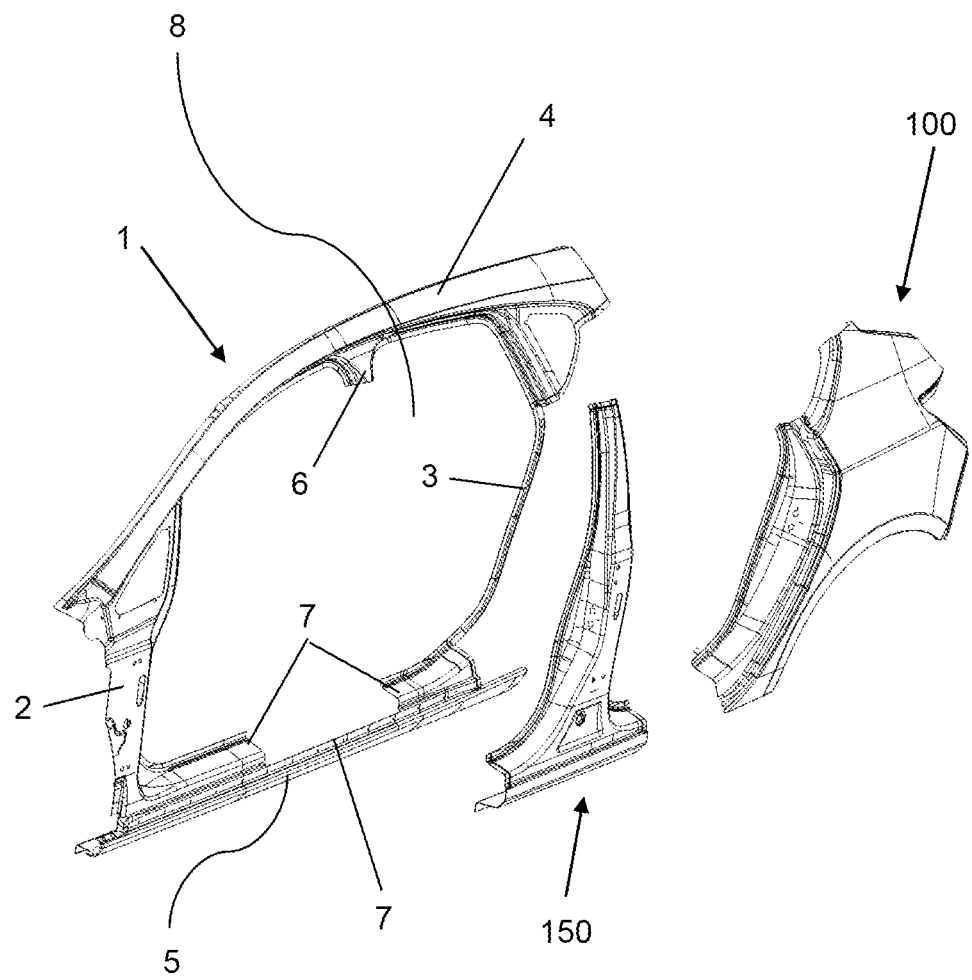
FIG. 3 shows the side wall module according to FIG. 1 in an exploded view.

FIG. 3 shows the outer side wall module 200 in an exploded view, based on which the individual components of the side wall module 200 are shown separately. As shown in FIG. 3, the outer side wall structure 1 has a front section 2 and a rear section 3, between which the front door and rear door (not shown in FIG. 3) of the motor vehicle can be situated. Furthermore, the outer side wall structure 1 has an upper section 4 and a lower section 5 which, together with the front section 2 and the rear section 3, form a peripheral frame, preferably like a closed ring. The outer side wall structure 1 is preferably formed by one part. For this purpose, the sections 2, 3, 4, 5 are preferably integrally connected to one another. Furthermore, the outer side wall structure 1 is preferably formed from a high-strength steel or a high-strength steel alloy.

The front section 2 is attachable to the A column (not shown in FIG. 3) of the motor vehicle or is part of the A column of the motor vehicle. The rear section 3 is attachable to the rear vehicle column, in particular to the C column or D column (not shown in FIG. 3) of the motor vehicle or is part of the C column or D column of the motor vehicle. Furthermore, the upper section 4 is attachable in the area of the roof (not shown in FIG. 3) of the motor vehicle or is part of the roof Moreover, the lower section 5 is situated in the area of a sill structure (not shown in FIG. 3) of the motor vehicle or is part of the sill structure.

A passage opening 8, which serves to accommodate the front door and rear door (not shown in FIG. 3) of the motor vehicle, is formed by the sections 2, 3, 4, 5, which are connected to one another to form a closed frame. The reinforcement element 150 is attachable to the outer side wall structure 1. For this purpose, the outer side wall structure 1 has an attachment point 6 on the upper section 4, which is preferably formed by a material section, in particular a flange, protruding into the passage opening 8. In addition, the lower section 5 has at least one attachment point 7 for attaching the reinforcement element 150 to the lower section 5 of the outer side wall structure 1. The at least one attachment point 7 is preferably formed by a longitudinal section of the lower section 5, against which a corresponding longitudinal section of the reinforcement element 150 can press and thus form a flange, by means of which the reinforcement element 150 and the lower section 5 can be fixed with one another, for example, using gluing, welding, or soldering. Additionally or alternatively, the attachment point 7 can also be formed by further material sections on the lower section 5, which correspond to material sections of the reinforcement element 150 and thus allow a connection, for example, by means of gluing, riveting, or soldering or welding.

The rear side wall structure 100 is preferably attached to at least one material section of the rear section 3, the outer side wall structure 1 having at least one material section, which corresponds to at least one material section of the rear side wall structure 100, so that fixing of the rear wall structure 100 on the outer side wall structure 1 is possible thereon by means of welding, soldering, riveting, or gluing.

The outer side wall structure 100 is reinforced and stiffened by the frame structure. Through the production of the side wall structure 100 from high-strength steel or high-strength steel alloy, a reinforcement or stiffening with respect to the outer side wall structure 1 additionally results. In addition, the outer side wall structure 1 has a relatively high material thickness or wall thickness. The outer side wall structure 1 is implemented for the purpose of exerting a supporting function with respect to the vehicle body. The rear side wall structure 100, which is preferably implemented as a fender, can be implemented having a lesser material thickness, since essentially no or only a slight supporting function with respect to the vehicle body is assigned to the rear wall structure.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An outer side wall structure for a motor vehicle, comprising:
    a front section attached directly to or that forms part of an A column of the motor vehicle;
    a rear section;
    a door situated between the front section and the rear section;
    an upper section and a lower section that are integral with the front section and the rear section to form a one-piece peripheral frame having a first material thickness, the peripheral frame having an outer side wall surface that forms the outer lateral skin of the motor vehicle and an inner side wall surface that faces toward an interior of the motor vehicle; and
    a fender connected to the rear section that has a second material thickness that is less than the first material thickness.

2. The outer side wall structure according to claim 1, wherein the motor vehicle is a passenger automobile.

3. The outer side wall structure according to claim 1, wherein the front section, the rear section, the upper section, and the lower section comprise a high-strength steel.

4. The outer side wall structure according to claim 1, wherein the front section, the rear section, the upper section, and the lower section comprise a high-strength steel alloy.

5. The outer side wall structure according to claim 1, wherein the rear section is configured to form a C column of the motor vehicle.

6. The outer side wall structure according to claim 1, wherein the upper section is attachable to a roof area of the motor vehicle.

7. The outer side wall structure according to claim 1, wherein the lower section is attachable to a sill structure of the motor vehicle.

8. The outer side wall structure according to claim 1, wherein the upper section and the lower section each have at least one attachment point for attaching a reinforcement element that forms a B column of the motor vehicle.

9. An outer side wall module, comprising:
    a side wall structure, comprising:
        a front section attached directly to or that forms part of an A column of the motor vehicle;
        a rear section;
        a door situated between the front section and the rear section; and
        an upper section and a lower section that are integral with the front section and the rear section to form a one-piece peripheral frame having a first material thickness, the peripheral frame defining a passage opening that receives the door, with the upper section having a first attachment point extending into the passage opening and the lower section having a second attachment point defined opposite the first attachment point;
    a reinforcement element that forms the B column of the motor vehicle and has a first end coupled to the first attachment point and a second end coupled to the second attachment point to divide the passage opening into two separate passage openings, the door situated in one of the two separate passage openings; and
    a fender connected to the rear section having a second material thickness, the first material thickness greater than the second material thickness.

10. The outer side wall module according to claim 9, wherein the outer side wall module has an outer side wall structure and an inner side wall structure, and is essentially free of a reinforcement structure located between the outer side wall structure and the inner side wall structure.

* * * * *